United States Patent Office 3,359,344
Patented Dec. 19, 1967

3,359,344
MIXED SPUN FIBERS CONTAINING POLYAMIDES OR POLYESTERS AND A SECOND COMPONENT SELECTED FROM THE GROUP OF POLYETHYLENE, POLYPROPYLENE OR POLYSTYRENE
Osamu Fukushima, Kurashiki, Japan, assignor to Kurashiki Rayon Company Limited, Kurashiki, Japan, a corporation of Japan
No Drawing. Filed July 6, 1964, Ser. No. 380,621
Claims priority, application Japan, July 22, 1963,
38/39,160, 38/39,161
3 Claims. (Cl. 260—857)

ABSTRACT OF THE DISCLOSURE

Fibers may be formed by mixing a spun fiber comprising a polymer selected from the group of polyethylene, polypropylene and polystyrene having a melting point lower than 170° C. with a second polymer selected from polyamides and polyesters having a melting point greater than 170° C., and an additional amount of the first polymer. In an example 55 parts of nylon 66 and 45 parts of polyethylene were blended and extruded to form a fiber. The blended fiber was cut and 40 parts of it were mixed with 60 parts of polyethylene powder and molded at 180° C.

---

This invention relates to a process for manufacturing shaped articles reinforced with mixed spun fibers, which is characterized in that a mixed spun fiber consisting of a first polymer (A-substance) having the melting point lower than 170° C. and a second polymer (B-substance) having the melting point higher than 170° C. is mixed with an additional amount of the A-substance and the mixture is shaped or molded at a temperature lower than that of the melting point of said B-substance.

The object of the invention is to provide a process for the manufacture of shaped articles having remarkably improved properties in tensile strength, impact resistance, heat resistance, hot water resistance etc. compared with the shaped articles of a single polymer.

Films and other various shaped articles of polyethylene, polypropylene and polystyrene are at present used over wide fields. However, they are not completely satisfactory in their heat resistance, hot water resistance and the like properties, and further improvements in such properties have been desired in the art.

After extensive studies on the improvements of above properties this inventor has accomplished the invention.

A number of methods for improving inherent disadvantages in the property of each plastic material by mixing various high molecular weight materials has been employed in the field of plastics, but they chiefly consist of various kinds of blended molding compound made by blending a plurality of high molecular weight substances themselves.

As the result of investigation about the state of the mixture of various blended high molecular weight substances and various properties of shaped articles made therefrom, the inventor has discovered that improvements in heat resistance and in hot water resistance by mixing high molecular weight materials are greatly influenced by the state of mixing and it is desirable to use a molecularly intermiscible high molecular weight material in order to obtain extremely good effects, and also it is desirable to use a relatively soft or flexible and dispersible high molecular weight material in order to improve the impact strength. However, only a few high molecular materials are known to satisfy the above requirements since it is a matter of great difficulty to obtain blended shaped articles having superior physical properties and intermiscibility by simply blending two kinds of high molecular materials together.

Various attempts have been made for improving the properties of many sorts of shaped articles by incorporating various kinds of natural or synthetic fiber made of high molecular weight material alone. In such cases, it is desirable that the adhesion between the high molecular weight material and the fiber should be strong enough. But the adhesion is not always satisfactory when the high molecular weight material and the natural or each independent synthetic fiber are quite different in their nature. Though blended shaped articles of single high molecular weight fiber with a similar high molecular material show excellent adhesion, they do not usually maintain fibrous form during the shaping operation so that the effect of introducing the fiber is not sufficiently recognized in most cases.

It has now been discovered by the inventor that many types of shaped articles made of polyethylene, polypropylene or polystyrene having greatly improved properties in heat resistance, hot water resistance, tensile strength, impact resistance while overcoming the foregoing difficulties can be obtained by molding polyethylene, polypropylene or polystyrene in mixture together with chopped strands having appropriate length of blended fiber of polyolefin, particularly polyethylene, polypropylene or polystyrene with a high molecular weight material having the melting point above 170° C.

In order that the invention may be more clearly understood it will be explained with examples as follows.

Example 1

55 parts of 6,6-nylon and 45 parts of polyethylene were blended in an extruder type spinning machine to prepare blended chip, which was then completely dried and extruded from an extruder type spinning machine through the spinneret at a temperature of 280° C. with the diameter of each hole 0.2 mm. and number of holes 300 at the winding velocity of 800 m./min., and cold-stretched for 250%. The blended fiber thus obtained was cut into a length of 0.5 mm. and 40 parts of the fiber was thoroughly mixed with 60 parts of polyethylene powder, then molded at 180° C. by means of an injection molder to produce a variety of shaped products. Film was made by the similar method as well.

Example 2

In this example, polyethylene in the blended fiber had fused and adhered perfectly with polyethylene during the molding, but 6,6-nylon was present in the product completely maintaining its fibrous state due to its high heat resistance.

Blended chips were prepared by mixing 55 parts of 6,6-nylon with 45 parts of polystyrene in the similar manner as the above example.

The fiber thus obtained was stretched 300% first at 170° C., then 100% at 210° C., and cut into 0.5 mm. length strand. 60 parts of the cut strand were thoroughly blended with 40 parts of polystyrene powder and injected at 180° C. from an injection molder to form various shaped articles.

In this case, complete fused adhesion took place between polystyrene in the fiber with polystyrene mixed later, but 6,6-nylon was present in the product completely maintaining its fibrous state due to its high heat resistance.

The effect and feature of the invention will be evident from the above explanation.

Any kind of polymers having melting points higher than 170° C. and enough miscibility as well as spinnability can be employed as the polymers to be admixed with polyolefin or polystyrene in the invention. Such polymers include: polyamide, polyester, polyurea, polyacrylonitrile, polyvinyl alcohol etc.

Example 3

40 parts of polypropylene were mixed with 60 parts of polyethylene terephthalate and extruded from an extruder type spinning machine through a spinneret having 300 holes, each 0.3 mm. in diameter, at the spinneret temperature of 310° C. and the fiber was taken up at a winding velocity of 800 m./min. while cooling the fiber passage for a distance of 10 cm. from the surface of spinneret by blowing air to lower the temperature for 50° C. than that of a conventional case.

The mixed fiber thus obtained was stretched for 200% at 80° C. then 100% at 100° C. The blended fiber of polypropylene with polyethylene terephthalate so obtained was cut into 0.3 mm. in length and 50 parts thereof were mixed with 50 parts of polypropylene and molded by an extruder molding machine to provide a shaped article.

Example 4

50 parts of polyethylene and 50 parts of 6-nylon were mixed and the mixture was extruded from an extruder type spinning machine through a spinneret having 300 holes, each 0.2 mm. in diameter, at the spinneret temperature of 260° C. and the fiber was taken up at a winding velocity of 500 m./min. while blowing air to cool the fiber passing for a distance of 10 cm. from the surface of the spinneret to lower the temperature for 80° C. than the usual spinning temperature. The fiber formed was cold-stretched for 150%. 70 parts of the blended fiber so obtained were mixed with 30 parts of polyethylene and fabricated into shaped article as the manner described in Example 3.

Example 5

A mixture of 40 parts of polystyrene and 60 parts of polyethylene terephthalate was extruded from an extruder type spinning machine through a spinneret having 300 holes, each 0.3 mm. in diameter, at the spinneret temperature of 310° C. while cooling the fiber passing up to 10 cm. from the surface of the spinneret to lower the temperature for 50° C. than that of usual temperature by blowing air, and wound up at a speed of 800 m./min.

The blended fiber thus obtained was stretched for 200% first at 80° C., then 100% at 100° C. The resulted blended fiber consisting of polystyrene and polyethylene terephthalate was cut into 0.3 mm. in length and 40 parts thereof were further mixed with 60 parts of polystyrene. The mixture was molded by an extruder into a shaped article.

Example 6

50 parts of polystyrene and 50 parts of 6-nylon were mixed and the mixture was extruded from an extruder type spinning machine through a spinneret having 300 holes, each 0.2 mm. in diameter, at the spinneret temperature of 260° C. by cooling the fiber while passing for a distance of 10 cm. from the spinneret surface at a temperature of 80° C. lower than usual temperature by blowing air, and the fiber was taken up at a velocity of 500 m./min. and cold-stretched for 150%. 30 parts of the resulted blended fiber were mixed with 70 parts of polystyrene and formed into a shaped article in a manner similar to that described in Example 5.

For comparison of properties of shaped articles manufactured according to the invention and those of shaped articles consisting of single polymer, physical properties of sample (1) a sheet of polystyrene alone, sample (2) a sheet of polyethylene alone, sample (3) a sheet of mixed shaped articles consisting of 60 parts of mixed spinning fiber having a mixture ratio of 50:50 of polystyrene to nylon and 40 parts of polystyrene, and sample (4) a sheet of shaped articles consisting of 60 parts of mixed spinning fiber having a mixture ratio of 50:50 of polyethylene to nylon and 40 parts of polyethylene are shown in Table 1.

TABLE 1

| Samples | (1) | (2) | (3) | (4) |
|---|---|---|---|---|
| Tensile strength, kg./cm.$^2$ | 350–550 | 150–200 | 700–1,000 | 500–700 |
| Breaking elongation, percent | 1–3 | 50–100 | 1–6 | 50–2C0 |
| Compressive strength, kg./cm.$^2$ | 800–1,000 | 160–200 | 1,000–1,500 | 200–250 |
| Bending strength, kg./cm.$^2$ | 600–800 | 300–350 | 1,000–1,500 | 200–1,000 |
| Impact strength, ft.-lb./inch | 0.5–0.9 | 4–7 | 3–7 | 10–11 |
| Hardness Rockwell | 50–90 | 70 | 100–150 | 150–170 |
| Temperature of thermal deformation, ° C. | 65–85 | 50–60 | 100–110 | 95–105 |

What I claim is:

1. A process for manufacturing shaped articles by mixing (1) a spun fiber consisting essentially of a first polymer having a melting point lower than 170° C. and selected from the group consisting of polyethylene, polypropylene and polystyrene blended with a second polymer having a melting point higher than 170° C. and selected from the group consisting of polyamides and polyesters with (2) an additional amount of said first polymer, and shaping the mixture at a temperature lower than the melting point of said second polymer, said first polymer being present in a major amount in the shaped article.

2. A process according to claim 1, wherein the temperature during the shaping step is above the melting point of said first polymer.

3. A process according to claim 1, wherein the temperature during the shaping step is above about 170° C.

References Cited

UNITED STATES PATENTS

| 3,107,228 | 10/1963 | Cappuccio | 260—857 |
| 3,112,300 | 11/1963 | Natta | 260—897 |
| 3,223,752 | 12/1965 | Tate | 260—873 |
| 3,322,854 | 5/1967 | Yasui | 260—857 |

MURRAY TILLMAN, *Primary Examiner.*

P. LIEBERMAN, *Assistant Examiner.*